United States Patent [19]
Meissner

[11] Patent Number: 5,858,232
[45] Date of Patent: Jan. 12, 1999

[54] FILTER CARTRIDGES WITH SEALING MEANS

[76] Inventor: Christopher A. Meissner, 4181 Calle Tesoro, Camarillo, Calif. 93012

[21] Appl. No.: 831,905

[22] Filed: Apr. 2, 1997

Related U.S. Application Data

[60] Provisional application No. 60/014,692 Apr. 2, 1996.
[51] Int. Cl.⁶ .................................................. B01D 27/08
[52] U.S. Cl. ......................... 210/450; 210/473; 210/474; 55/502
[58] Field of Search ................................... 210/450, 473, 210/474; 55/502

[56] References Cited

U.S. PATENT DOCUMENTS

| | | | |
|---|---|---|---|
| 4,557,834 | 12/1985 | Mason | 210/450 |
| 5,128,037 | 7/1992 | Pearl et al. | 210/450 |
| 5,389,260 | 2/1995 | Hemp et al. | 210/450 |
| 5,399,264 | 3/1995 | Pulek et al. | 210/450 |
| 5,417,860 | 5/1995 | Kay | 210/474 |
| 5,478,469 | 12/1995 | Bryan et al. | 210/450 |
| 5,536,395 | 7/1996 | Kuennen et al. | 210/232 |

*Primary Examiner*—David A. Reifsnyder
*Attorney, Agent, or Firm*—Christie, Parker & Hale, LLP

[57] ABSTRACT

A filter cartridge for purifying fluids such as water and chemicals is provided with sealing rings integrally formed with and extending circumferentially from a tube connected to the housing of the filter cartridge and intended to be inserted into a receptacle for providing or receiving fluids. The rings are elastic and compress when the filter cartridge is inserted into the receptacle, thereby providing a seal between the filter cartridge and the receptacle.

15 Claims, 2 Drawing Sheets

FILTER CARTRIDGES WITH SEALING MEANS

RELATED APPLICATION

This application is based on and claims the priority of provisional patent application Ser. No. 60/014,692, filed Apr. 2, 1996. The disclosure of which is incorporated herein by reference.

BACKGROUND OF THE INVENTION

This invention relates to fluid seals, and more particularly to a fluid seal for a fluid sterilizing filter cartridge.

Fluids such as water and other chemicals can be purified by passing the fluids through a filter material. The filter material may be adapted to remove particulate matter from the fluids. In addition, the filter material may also be designed to bind impurities such as ions or minerals dissolved in the fluids. Typically, such filter materials are contained in filter cartridges. The fluid that is to be filtered and/or purified may pass from one end of the cartridge to the other, thereby passing through the filter material contained in the cartridge. Alternatively, the filter cartridge may have a permeable cylindrical housing and the fluid that is to be filtered and/or purified passes through the housing and then the filter material into a inner core, upon which the filtered fluid exits the filter cartridge through an opening in one of the ends of its housing.

Certain industries, such as the photo resist industry, require filters for ultra purification of fluids. Such filters must remove not only particulate matter but also ions (especially metal ions) and minerals as described above. Filters used in ultra purification should not contribute impurities to the fluid that is to be purified. The components of such filters should not be made of materials that contain "extractables," which are chemicals that leach into the fluid that is to be purified. Accordingly, the housing and other components of a filter cartridge for ultra purification are typically constructed of inert thermoplastics such as polytetrafluroethylene (PTFE), commercially known as Teflon®, or polypropylene, both of which are materials that are very low in extractables yet have an appropriate toughness, strength, and temperature resistance to be useful in forming the components of filter cartridges.

Filter cartridges usually are designed to mate or attach at one end to a drain for filtered fluid or a source of unfiltered fluid. "Unfiltered" refers to fluid that has yet to pass through the filter material in the filter cartridge, at least on the current pass. In the case of flow-through filter cartridges, the end of the filter cartridge through which unfiltered fluid enters may be mated to a receptacle for providing the unfiltered fluid to the cartridge or may be open within a housing that supplies the unfiltered fluid to the cartridge. The other end of the flow-through filter cartridge may be mated to a receptacle for receiving filtered fluid from the filter cartridge. Filter cartridges with housings that are permeable to unfiltered fluid are usually mated to receptacles that receive filtered fluid from the cartridges.

Means for sealing the juncture between that portion of a filter cartridge that is attached to a receptacle and the receptacle itself must be provided in order to avoid contamination of filtered fluid with unfiltered fluid or to prevent leaks of fluid from the filtration system.

It is known to use a knife edge, typically in the form of a ring extending inwardly from a metallic housing around an inlet or an outlet against which an end of a filter cartridge is compressed. That end of the filter cartridge is typically formed of an elastomeric substance and the knife edge indents the compressible material of the end of the filter cartridge in order to provide a fluid tight seal. The disadvantage of this method of sealing the juncture between the receptacle and the filter cartridge is that the filter cartridge must be kept axially compressed tightly against the housing. This method of sealing the filter cartridge does not provide much tolerance for movement or changes in positioning of the filter cartridge.

It is also known to use an axially compressible seal for a filter cartridge, such as that described in U.S. Pat. No. 5,399,264 to Pulek et al. The successful employment of this seal also requires that the filter cartridge be tightly compressed against a housing.

O-rings are the most common means of sealing a filter cartridge used for sterilizing fluids. Typically, an end of the filter cartridge is tubular and is intended to fit within a cup-like receptacle that receives or provides a flow of fluid from or to the filter cartridge. Circumferential grooves in the walls of the tubular end receive O-rings (two is the standard) that compress radially inwardly when the tubular end is inserted into the cup-like receptacle. The use of O-rings provides a very good seal that accommodates the normal tolerances of construction of the receptacle and the tubular end as well as variations in the positioning of the filter cartridge within the receptacle.

Because O-rings must be compressible to perform a sealing function, they are typically constructed of elastomeric materials that have extractables and may be degraded by the chemicals that are to be purified. Examples of such elastomeric materials are EPR, silicone, Viton and Fiuna. In order to reduce the contribution of extractables to the filtered fluid, manufacturers have encased O-rings in PTFE, thus sealing in the extractables contained in the material of the O-ring while retaining the resilience of the underlying elastomeric material. O-rings constructed in this manner, however, are expensive. The O-rings can contribute extractables to the filtered fluid if their PTFE coating cracks or breaks.

Accordingly, industries that must use ultrapure water and chemicals need a filter cartridge with means for a good seal that will accommodate construction tolerances as well as variations in position of the filter cartridge with respect to a receptacle, yet contribute no more extractables than would be provided by the inert materials normally used to construct the filter cartridge.

SUMMARY OF THE INVENTION

The present invention provides a filter cartridge having a sealing means. The filter cartridge is installed in a filter housing that has an opening to permit egress or ingress of fluid into or out of the cartridge. The cartridge has an end cap with a tube to connect the cartridge to the inlet or outlet of the housing. One or more compressible sealing rings formed in a one piece construction with the tube of the cartridge extend circumferentially from the tube for elastically contacting the receptacle to prevent flow of fluid through the juncture between the ring and the receptacle. Since the sealing ring is made from the same material as the cartridge, it does not contribute to the problem of chemical compatibility and extractables, as do O-rings.

In a preferred embodiment, the ring extends away from the first end of the tube at an angle of between 0 and 20 degrees to a plane perpendicular to the axis of the cartridge. Preferably, the angle is between 10 degrees and 20 degrees.

3

The invention will be explained below by the description of preferred embodiments as well as the accompanying drawing figures.

DETAILED DESCRIPTION OF THE PREFERRED EMBODIMENTS

Figure 1:
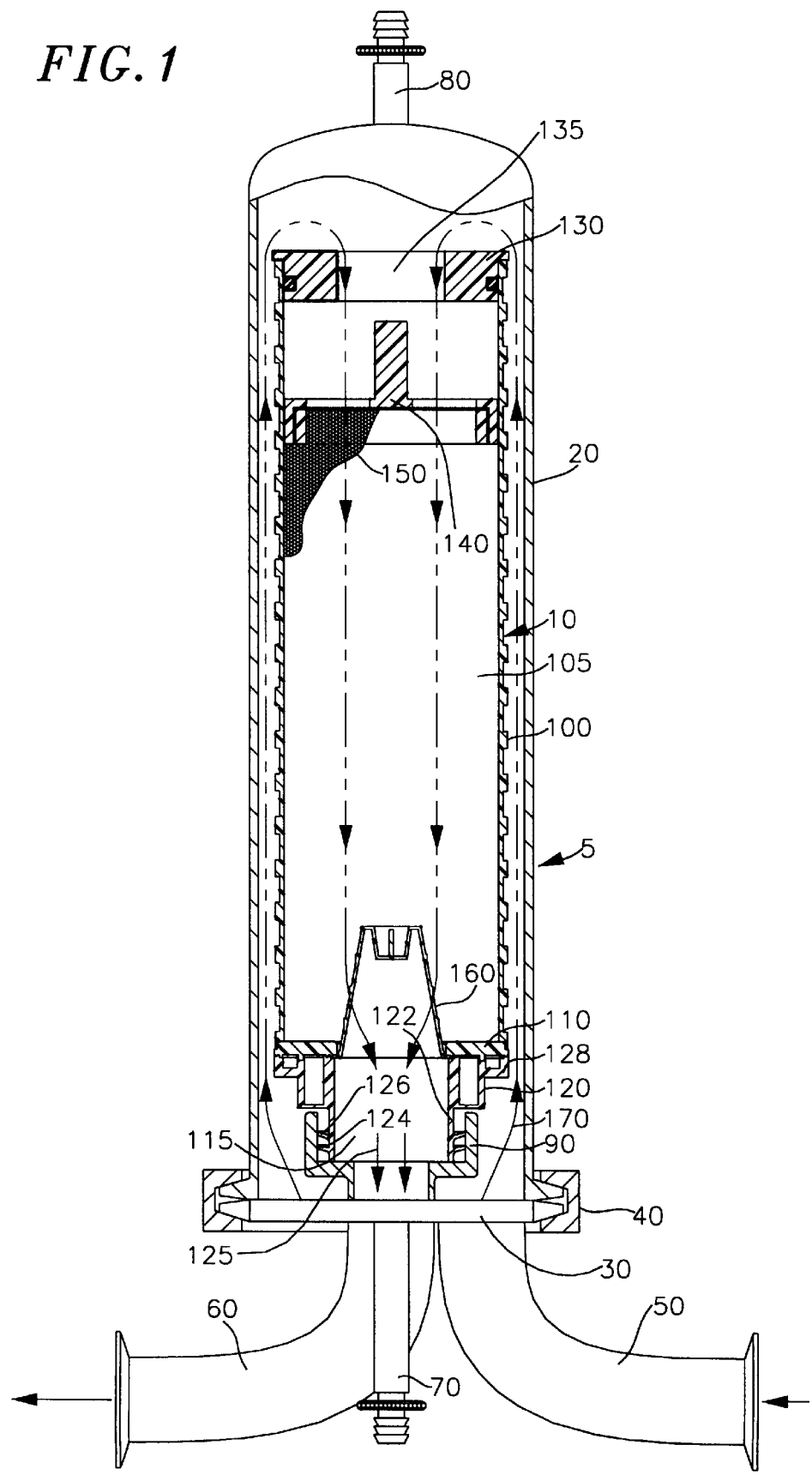
FIG. 1 is a plan view of a filter housing with a partial cut away showing a filter cartridge with sealing means according to a preferred embodiment of the invention in cross-section.

FIG. 1 shows a filter 5 for purifying fluids such as water or chemicals containing a filter cartridge 10 constructed according to a preferred embodiment of the invention. The filter shell 20 and the filter base plate 30 are secured to each other by the clamp 40. The inlet tube or port 50, which is attached to the filter base plate 30, supplies fluid to be purified into the compartment formed by the filter shell 20 and the filter base plate 30. The outlet tube or port 60, which is secured to the filter base plate 30, removes purified fluid from the filter 5. The filter 5 is provided with the drain 70, which is attached to filter base 30, and vent 80, which is attached to the filter shell 20. Compressed air may be supplied to the vent 80 to drive fluid out of the filter 5 via the drain 70 before unclamping the filter housing 20 from the filter base plate 30 in order to perform maintenance and to replace filter cartridge 10.

Filter cartridge 10 lies in a cavity formed in the filter shell 20. The filter cartridge 10 is detachably mounted within the filter 5 by insertion into the outlet cup 90. The outlet cup 90 is secured to the outlet tube 60 and collects purified fluid exiting the filter cartridge 10 in order to discharge that fluid via the outlet tube 60. The phantom flow lines 170 show the direction of fluid flow through the filter 5. The filter cartridge 10 has a cartridge housing 100 having walls (which are ribbed exteriorly for radial strength) in the form of a cylinder defining a compartment 105. An outlet end plate 110 is welded to one of the ends of the cartridge housing 100. The outlet end cap 120 is welded to the outlet end plate 110. The fixed septum 160 is trapped between the outlet end plate 110 and the outlet end cap 120. The outlet end plate 110 is in the shape of a disc with a central hole and the outlet end cap 120 is in the overall shape of a stepped tube or cylinder with a central passage. Together, the hole in the outlet end plate 110 and the passage in the outlet end cap 120 define an outlet passage 115 which permits egress of filtered fluid from the filter cartridge 10.

The outlet end cap 120 has a tube 122 extending from it which is shaped and sized to be inserted into the outlet cup 90. The sealing rings 124 and 126 extend from the tube 122 and provide a seal between the tube 122 and the outlet cup 90. The tube 122 is attached at its other end to a flange 128 that is welded to the outlet end plate 110.

The other end of the cartridge housing 110 is detachably secured to the inlet end cap 130. The inlet end cap 130 contains the inlet passage 135 which permits fluids to enter the filter cartridge 10. The fluid will flow through the filter cartridge from the inlet passage 135 to the outlet passage 115.

A portion or subcompartment of the compartment 105 is packed with the resin beads 150, which are used to purify the fluid passing through the filter cartridge by removing ions and minerals. The resin beads 150 are secured within the filter cartridge 10 during operation of the filter 5 by the upstream or plunger septum 140 and the downstream or fixed septum 160. The septums 140 and 160 are permeable to the flow of fluid in order to permit fluid to flow through the filter cartridge 10. The septums 140 and 160 are not permeable to the resin beads 150 and therefore secure the resin beads 150 within the filter cartridge 10.

This preferred embodiment is described in connection with a particular type of filter cartridge in which the fluid to be filtered passes from one end of the cartridge to the other end of the filter cartridge through the internal compartment of the filter. A filter cartridge with sealing means according to the present invention could be of the type in which the filter cartridge housing is itself permeable to the fluid that is to be filtered and the fluid that is to be filtered enters through the housing and then passes through the filter material into an internal core of the filter cartridge. The filtered fluid would then exit the core of the filter cartridge through an outlet with sealing means corresponding to the combination of the outlet end plate 110 and the outlet end cap 120 described above. An example of a filter cartridge with a permeable housing is shown in U.S. Pat. No. 5,399,264 to Pulek et al., the disclosure of which is expressly incorporated into this application by reference.

Figure 2:
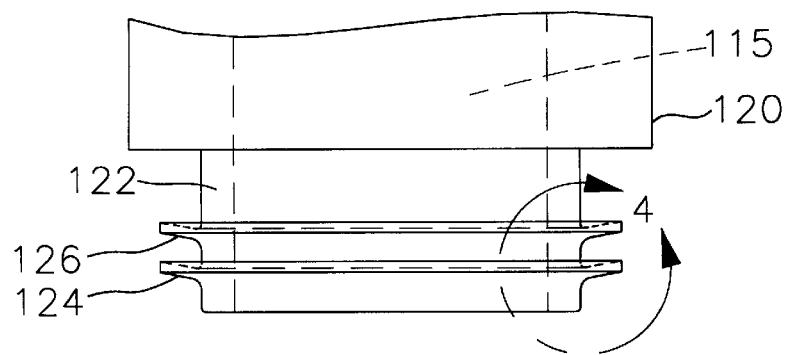
FIG. 2 is a partial plan view of the preferred embodiment of the filter cartridge with sealing means of the invention shown in FIG. 1.

FIG. 2 shows a plan view of a portion of the outlet end cap 120 of the filter cartridge 10 shown in FIG. 1. The outlet end cap 120 is made by molding or milling an inert material such as polypropylene that is low in extractables and has the appropriate combinations of toughness, strength and temperature resistance. Examples of other appropriate low-extractable materials include PTFE, polyester, PVDF, and PFA. Preferably, end cap 120 is made from the same material as the rest of the cartridge. As seen in FIG. 1, one end of the outlet end cap 120 is welded to the outlet end plate 110. The other end is formed as a tube 122 that is designed to fit inside the outlet cup 90. The outlet cup 90 acts as a receptacle for receiving the filtered fluid from the filter cartridge 10 and transmitting that filtered fluid to outlet tube 60.

The tube 122 is equipped with sealing rings 124 and 126 in a one piece construction, instead of O-rings to provide a good seal between the tube 122 and the outlet cup 90. The inlet port 50 is coupled to the outside of cup 90 on the upstream side of the sealing rings 124 and 126, and the outlet port 60 is coupled to the interior of cup 90 on the downstream side of the sealing rings 124 and 126 such that fluid flows from the inlet port 50 through the filter cartridge 10 to the outlet port 60.

The rings 124 and 126 are integrally formed (by molding or milling) with the tube 122 in a one piece construction and are disposed circumferentially around the tube 122. The rings 124 and 126 have an outer diameter that is slightly greater that the inner diameter of outlet cup 90. The rings 124 and 126 generally extend radially outward from the tube 122 and are thin enough to be elastic and bendable when the tube 122 is inserted into the outlet cup 90. As a result, the rings are deformed inwardly when the tube 122 is inserted into the outlet cup 90 and therefore press back against outlet cup 90 as they attempt to regain their relaxed, i.e., undeformed condition. The amount of "compression" of the rings depends upon the difference between the ID of outlet cup 20 and the OD of tube 122. The bias of the rings against outlet cup 90 therefore provides a seal against the flow of fluid between the tube 122 and the outlet cup 90 much the way that the compression of an O-ring seals the interface between two parts. In most cases the type of material used for the cartridge is too hard to be made into an O-ring, so use of rings 124 and 126 offers a solution that avoids the problem of seal compatibility.

Figure 3:
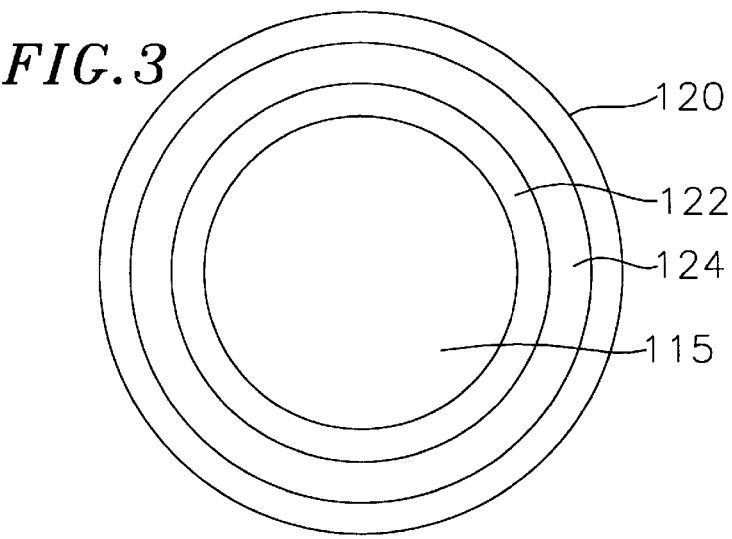
FIG. 3 is an end view of the preferred embodiment of the filter cartridge with sealing means of the invention shown in FIG. 1.

FIG. 3 shows an end view of the outlet end cap 120 of the filter cartridge 10 shown in FIGS. 1 and 2. The first ring 124 is shown to be concentric about the outlet passage 115.

Figure 4:
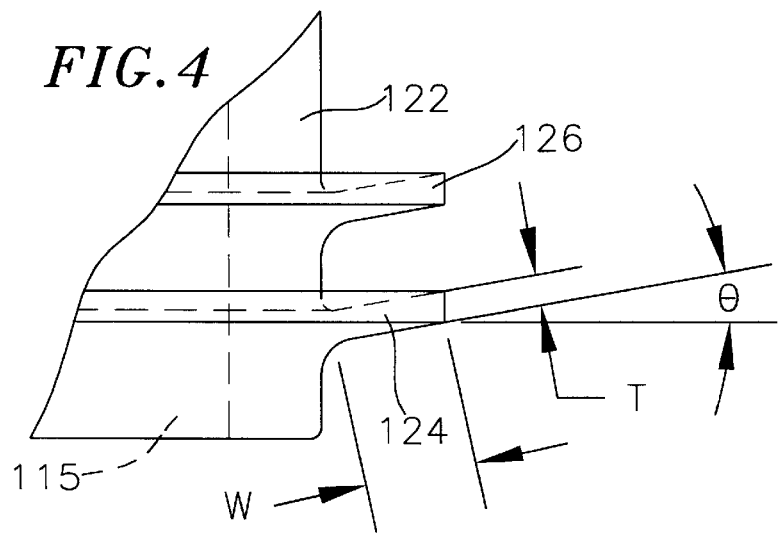
FIG. 4 is an expanded view of a portion (indicated in FIG. 2) of the preferred embodiment of the filter cartridge with sealing means shown in FIG. 1.

FIG. 4 is an expanded view of a portion of the tube 122 shown in FIG. 2. In the preferred embodiment of the invention shown in FIG. 4, the rings are slightly angled away from the direction of insertion of tube 122 into outlet cup 90, which is represented by arrows 125, so the angle increases slightly when cartridge 10 is inserted. Preferably, the angle is between 10 degrees and 20 degrees with respect to a plane perpendicular to the axis of cartridge 10. In FIG. 4, this angle is indicated by the Greek letter theta ($\Theta$). The rings 124 and 126 are angled away from a first or outlet end of the tube 122 and towards the second or upstream end of the tube 122 which is connected to the rest of the outlet end cup 120. The rings therefore are angled toward the housing 100 of the filter cartridge 10 and define conical surfaces interrupted by the tube 122. The rings 124 and 126 are angled away from the outlet end of the tube 122 to permit easier insertion of the tube 122 into the outlet cup 90 and to form an effective seal with broad tolerances.

In the embodiment of the invention shown in FIG. 1, the unfiltered fluid that enters filter 5 is at a higher pressure than the filtered fluid that exits filter cartridge 10. This unfiltered fluid will therefore exert a pressure on the ring 126 and, if any fluid passes the ring 126, on ring 124, which further biases or urges these rings against the outlet cup 90.

Figure 5:
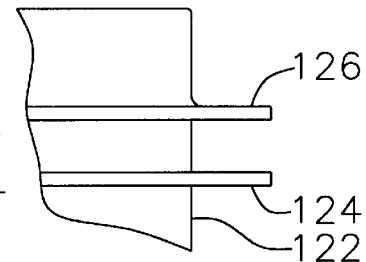
FIG. 5 is an expanded view of a portion of an alternative embodiment of the filter cartridge with sealing means shown in FIG. 1.

A preferred angle ($\Theta$) for the rings 124 and 126 is between 10 degrees and 20 degrees. The angle ($\Theta$) of the rings can vary from zero degrees to at least as much as 20 degrees depending on the material chosen for the tube 122 and the thickness of the rings 124 and 126. In FIG. 5 is illustrated an embodiment in which the angle is zero degrees, i.e., the rings are perpendicular to the axis of cartridge 10 when not deformed.

The thickness (T) of the rings, their width or radial extent (W) and the material of which they are made will also affect their overall flexibility and tolerance for variation of ring and cup size and shape. Two rings are provided for additional security although it has been found that one ring is usually adequate. Bubble point tests with alcohol and with water at pressures up to 60 psi indicate that the sealing rings shown in the described embodiments provide an adequate seal in typical environments.

In general, it has been observed that a smaller angle $\Theta$ of the rings 124 and 126 (i.e., the rings are more nearly perpendicular to the tube) will result in lower tolerance for variations in cup and ring size and shape and more difficulty in the insertion of the filter cartridge 10 into the outlet cup 90. A larger angle $\Theta$ of the rings within limits (the rings are further from perpendicularity to the tube) will result in greater tolerance for variations in cup and ring size and shape and for greater ease in insertion of the filter cartridge 10 into the outlet cup 90. On the other hand, larger angles are more difficult to manufacture, i.e., mold or machine. Thus, the selection of angle is a tradeoff between difficulty in insertion and manufacture.

Several specific examples of angles were tested and the results are set forth below.

EXAMPLE 1

Two cylindrical rings were machined in a polypropylene end tube as show in FIG. 5. These rings have no angles and are easy to machine and mold. They were machined 0.005" larger than the cup they were fitting into (1.759"), i.e., a 0.005" compression fit. The top ring was 0.035" thick and the second ring was 0.028" thick. Installation of the end tube into the housing cup required 41 pounds of insertion force. 122 psi air pressure was applied to the housing inlet and no leakage of the seal occurred. After removal of the end tube, permanent distortion of the second ring was detected indicating that it was too thin. The 0.035" ring remained unchanged. This indicated that the thinnest ring that could be produced is about 0.035" think; however this thickness is still very stiff and difficult to install in the housing (41 pounds of insertion force). It is desirable to make the rings so that the end cap can be removed and re-installed in the housing several times without loss of performance and therefore there should be no permanent distortion. A smaller diameter adapter would be easier to install but it would also have the disadvantage of requiring the mating cup to be machined to very tight tolerances. It is also desirable for the size of the mating cup be as non-critical as possible to the establishment of an effective seal so that existing housings already in the field can be retrofitted with the invention.

EXAMPLE 2

A second end tube was machined as shown in FIG. 4. This end tube was machined with an angle of 10 degrees and also had a 0.005" compression fit. It required 15.8 pounds of insertion force to install. It was installed in a housing and removed approximately 10 times and then leak tested. No leaks were detected at 122 psi of pressure.

EXAMPLE 3

A third end tube was machined as shown in FIG. 4. This end tube was machined with an angle of 20 degrees and a 0.005" compression fit. It required 12.7 pounds of insertion force. No leaks were detected at 122 psi of pressure.

EXAMPLE 4

A fourth adapter was machined with a 45 degree angle and a 0.005" compression fit. It required 1.2 pounds of insertion force. No leak occurred at 1 psi, but 2 ml/min bypassed at 2 psi, 15 ml/min at 5 psi, and 38 ml/min at 10 psi. Thus, for the material and ring dimensions used, a 45 degree angle was not suitable for sterilization purposes. But the exact limit beyond a 20 degree angle was not determined.

In summary, for the material and ring dimensions used, the optimum angle of construction as measured perpendicular to the axis of cartridge 10 is about 10 to 20 degrees.

While the invention has been described in detail with respect to certain and preferred embodiments, it should be understood that the invention is not limited to those precise embodiments, and that those embodiments are instead representative examples of the many modifications and variations which present themselves to those skilled in the art to which the invention pertains without departing from the scope and spirit of this invention, as defined in the appended claims.

What is claimed is:

1. A filter cartridge for filtering fluid comprising:

a housing containing filter material and having an opening to permit egress or ingress of fluid, a tube having walls defining a passage between first and second ends, the tube including the first end being adapted to be contained in a receptacle for providing or receiving fluid and the second end of the tube operatively communicating with the opening, and a compressible ring integrally formed with and extending outwardly and circumferentially from the tube for elastically contacting the receptacle to prevent flow of fluid between the ring and the receptacle, the ring being angled away from the first end of the tube.

2. The filter cartridge according to claim 1 in which the tube and ring are made of a material low in extractables.

3. The filter cartridge according to claim 2 in which the material low in extractables is selected from the group consisting of polypropylene, polyester, PTFE, PVDF, and PFA.

4. The filter cartridge according to claim 1 further comprising a plurality of compressible rings.

5. The filter cartridge according to claim 1 further comprising a flange attached to the second end of the tube for operative communication with the housing at the opening.

6. The filter cartridge of claim 1, in which the ring is angled away from the first end of the tube to form an angle of between 10 degrees and 20 degrees.

7. The filter cartridge of claim 6, in which the first end is adapted to be contained in a receptacle for receiving fluid at a pressure less than the pressure outside the receptacle so the ring is biased toward the first end.

8. The filter cartridge of claim 1, in which the first end is adapted to be contained in a receptacle for receiving fluid at a pressure less than the pressure outside the receptacle so the ring is biased toward the first end.

9. A filter assembly comprising:

a filter shell having a cartridge receiving cavity;

a replaceable filter cartridge disposed in the cavity;

a fluid coupling tube at one end of the cartridge;

a compressible sealing ring formed in a one piece construction with the tube;

a cup in the cavity into which the tube fits such that the sealing ring is deformed inwardly to form a seal between the tube and the cup;

a fluid inlet port;

a fluid outlet port;

means for coupling one of the ports to the interior of the cup on one side of the sealing ring; and means for coupling the other port to the cavity outside the cup on the other side of the sealing ring such that fluid flows from the inlet port through the cartridge and the tube to the outlet port.

10. The filter assembly of claim 9, in which the sealing ring is angled toward the cartridge.

11. The filter assembly of claim 10, in which the pressure at the one port is lower than the other port.

12. The filter assembly of claim 10, in which the one port is the outlet port, the other port is the inlet port, and the fluid at the inlet port has a higher pressure than the outlet port to bias the ring against the cup.

13. The filter assembly of claim 9, in which the outer diameter of the sealing ring is slightly greater than the inner diameter of the cup.

14. The filter assembly of claim 9, additionally comprising another sealing ring formed in a one piece construction with the tube which is deformed inwardly to form a seal between the tube and the cup when the tube fits in the cup.

15. The filter assembly of claim 14, in which the other sealing ring is angled toward the cartridge.

* * * * *

UNITED STATES PATENT AND TRADEMARK OFFICE
CERTIFICATE OF CORRECTION

PATENT NO. : 5,858,232
DATED : January 12, 1999
INVENTOR(S) : Christopher a. Meissner It is certified that error appears in the above-identified patent and that said Letters Patent is hereby corrected as shown below:

ON THE TITLE PAGE:

Item [56] References Cited, under U.S. PATENT DOCUMENTS, insert the following references:

| | | | |
|---|---|---|---|
| 4,277,338 | 7/1981 | Hoagland | 210/186 |
| 4,859,328 | 8/1989 | Groezinger et al. | 210/232 |
| 5,554,283 | 9/1996 | Brinda et al | 210/321.8 |

Column 1, line 26, change "a inner" to -- an inner --.
Column 1, line 40, change "tetrafluroethylene" to -- tetrafluoroethylene --.
Column 4, line 64, after "greater" change "that" to -- than --.
Column 6, line 21, change "think" to -- thick --.

Signed and Sealed this

Twenty-eighth Day of December, 1999

Attest:

Attesting Officer

Q. TODD DICKINSON

Acting Commissioner of Patents and Trademarks